United States Patent [19]

Lewis, Jr.

[11] Patent Number: 4,573,069

[45] Date of Patent: Feb. 25, 1986

[54] CHROMINANCE FINE GAIN CONTROL IN A DIGITAL TELEVISION RECEIVER

[75] Inventor: Henry G. Lewis, Jr., Hamilton Square, N.J.

[73] Assignee: RCA Corporation, Princeton, N.J.

[21] Appl. No.: 594,807

[22] Filed: Mar. 29, 1984

[51] Int. Cl.[4] .................... H04N 9/64; H04N 5/52
[52] U.S. Cl. .................................. 358/27; 358/174
[58] Field of Search ................ 358/27, 40, 174, 169, 358/13; 375/22, 24; 370/9, 11

[56] References Cited

U.S. PATENT DOCUMENTS

| | | | |
|---|---|---|---|
| 4,095,218 | 6/1978 | Crouse | 340/347 |
| 4,096,475 | 6/1978 | Ong | 340/347 |
| 4,390,849 | 6/1983 | Miskin | 330/251 |
| 4,447,826 | 5/1984 | Lewis, Jr. et al. | 358/27 |
| 4,466,015 | 8/1984 | Wargo et al. | 358/27 |
| 4,506,291 | 3/1985 | Lewis, Jr. | 358/33 |

FOREIGN PATENT DOCUMENTS 0094670 11/1983 European Pat. Off.
2102644A 2/1983 United Kingdom.

OTHER PUBLICATIONS

Application Ser. No. 537,814, filed Sep. 30, 1983, H. G. Lewis, Jr., Automatic Chrominance Control for a Digital Television Receiver.

*Primary Examiner*—James J. Groody
*Assistant Examiner*—Michael P. Dunnam
*Attorney, Agent, or Firm*—E. M. Whitacre; P. J. Rasmussen; E. P. Herrmann

[57] ABSTRACT

Gain control of signals processed in a digital TV receiver is split between serially connected coarse and fine gain blocks. The coarse gain block consists of bit shifters to shift the sample bits to greater or lesser significant bit positions which provides a 6 dB gain change for each bit position change. Fine gain control is performed in the digital-to-analog converters which ultimately produce the analog signals for driving the display tube. The digital-to-analog converters are selectively reset each sample period with reset pulses that are developed by a fine gain control. The output signal from the digital to analog converter is an amplitude and pulse width modulated signal. The average amplitude of the signal over a sample period is determined by the pulse width and is thus a function of the fine gain control.

13 Claims, 4 Drawing Figures

CHROMINANCE FINE GAIN CONTROL IN A DIGITAL TELEVISION RECEIVER

The present invention relates generally to video signal processing apparatus and particularly to fine gain control apparatus in the automatic chrominance control circuitry of a digital color television receiver.

In color television receivers, automatic chrominance control (ACC) circuitry responds to the color reference burst component of the chrominance component of a composite video signal to ensure that the amplitude of chrominance signal component remains within standardized minimum and maximum values. A standardized chrominance signal is desirable to keep the intensity of the displayed image relatively invariant for both weak and strong signals. Only when the signal is so weak as to make satisfactory color portrayal unlikely is the chrominance component allowed to vary substantially from the standard. Under these conditions its amplitude is forced to zero by the color killer circuitry of the receiver.

In addition to standardizing the incoming video signals, the ACC circuitry amplifies or attenuates the chrominance signals according to the settings of viewer color controls such as the saturation (SAT) and picture (PIX) controls of, for example, the RCA Colortrak (TM) system. The peak amplitude values of the chrominance signal are also monitored by the ACC circuitry, and the chrominance signal gain is adjusted, responsive to these values, to avoid displaying oversaturated colors.

In the ACC system of an analog receiver, the multiple gain control circuits that implement these functions are realized with relative simplicity by analog amplifiers. A parallel implementation in a digital receiver would have each analog amplifier replaced by a digital multiplier. The size and complexity of digital multiplier circuits, however, makes this parallel implementation impractical. Two designs for ACC apparatus in a digital television receivers that utilize simplified digital multipliers are set forth in U.S. Pat. No. 4,447,826 "DIGITAL TELEVISION RECEIVER AUTOMATIC CHROMA CONTROL SYSTEM" (Lewis, Jr. et al.) and Ser. No. 537,814 "AUTOMATIC CHROMINANCE CONTROL FOR A DIGITAL TELEVISION RECEIVER" (Lewis, Jr.).

Both of these applications describe ACC apparatus using controllable shift registers for coarse gain control and some other means for fine gain control. In the first application (Lewis, Jr. et al.) a digital multiplier that includes an adder and a random access memory controlled by a microprocessor provides fine gain adjustment up to a total of 6 dB. In the latter application (Lewis, Jr.) an analog IF tilt circuit provides fine gain control instead of a multiplier.

An ACC apparatus using a fine gain control apparatus that does not require even a simplified multiplier and does not impose frequency domain distortion on the incoming signal would be advantageous.

SUMMARY OF THE INVENTION

Accordingly, the present invention is an improved apparatus for providing fine gain control in a digital video signal processor. The apparatus includes a digital-to-analog (D/A) converter that produces a pulse amplitude modulated output signal. The D/A converter is resettable via a reset input; its output signal being forced to a predetermined value (e.g. ground potential) when a certain logic level (e.g. a low logic level) is applied to the reset input. The average amplitude value of the output signal of the D/A converter over one sample period, and thus the gain of the circuit, can be controlled by applying variable width pulses to the reset input of the D/A converter. To this end, the output of a pulse generator—responsive to a control signal for providing variable width pulses—is coupled to the reset input of the D/A converter. The range of pulse widths provided are between one sample period and one-half sample period, providing fine gain control between 0 dB and −6 dB.

In the drawing, broad arrows represent busses for multiple-bit parallel digital signals. Shaded busses carry control signals and non-shaded busses carry data signals. Line arrows represent interconnections carrying analog signals or single bit digital signals. All busses are assumed to be eight bits wide unless otherwise indicated. A small circle at the input terminal of a logic device indicates that the device responds to the logical complement of the signal applied to that terminal.

As used herein, digital shifters or shift registers provide bit position shifting equivalent to multiplication by one-half (division by two) for each bit position shift rightward and equivalent to multiplication by two (division by one-half) for each bit position shift leftward. This process is also expressed as an amplitude or magnitude change by a factor of $2^N$ where N is a positive or negative integer corresponding to the number of bit positions by which the digital codeword is shifted. An increase in gain by a factor of 2 is also referred to as a gain increment of 6 dB, or, more generally, an increase by a factor of $2^N$ is a 6N dB gain increment.

For the illustrative embodiment of the invention described below, the gain in the chrominance channel can vary between −24 dB and +24 dB. This is based on a television receiver having a color killer threshold of −24 dB with respect to nominal color burst signal level, and in which the burst level is not greater than +6 dB with respect to the nominal level. Thus, 18 dB of viewer preference PIX correction is allowed within the ACC loop. In addition, up to 6 dB of attenuation can be provided for chrominance overload correction to compensate for the error condition which can occur when the transmitted color reference burst signal is up to 6 dB below its nominal value with respect to the transmitted chrominance signals. The gain ranges and requirements of the described illustrative embodiment are summarized in TABLE I.

TABLE I

| Function | Gain Requirements Gain Range (Value) | Gain Range (dB) |
|---|---|---|
| PIX | 1 to $\frac{1}{8}$ | 0 to −18 |
| SAT | 2 to $\frac{1}{4}$ | +6 to −12 |

TABLE I-continued

| Function | Gain Requirements | |
|---|---|---|
| | Gain Range (Value) | Gain Range (dB) |
| ACC | 8 to ½ | +18 to −6 |
| COD | 1 to ½ | 0 to −6 |

Figure 1:
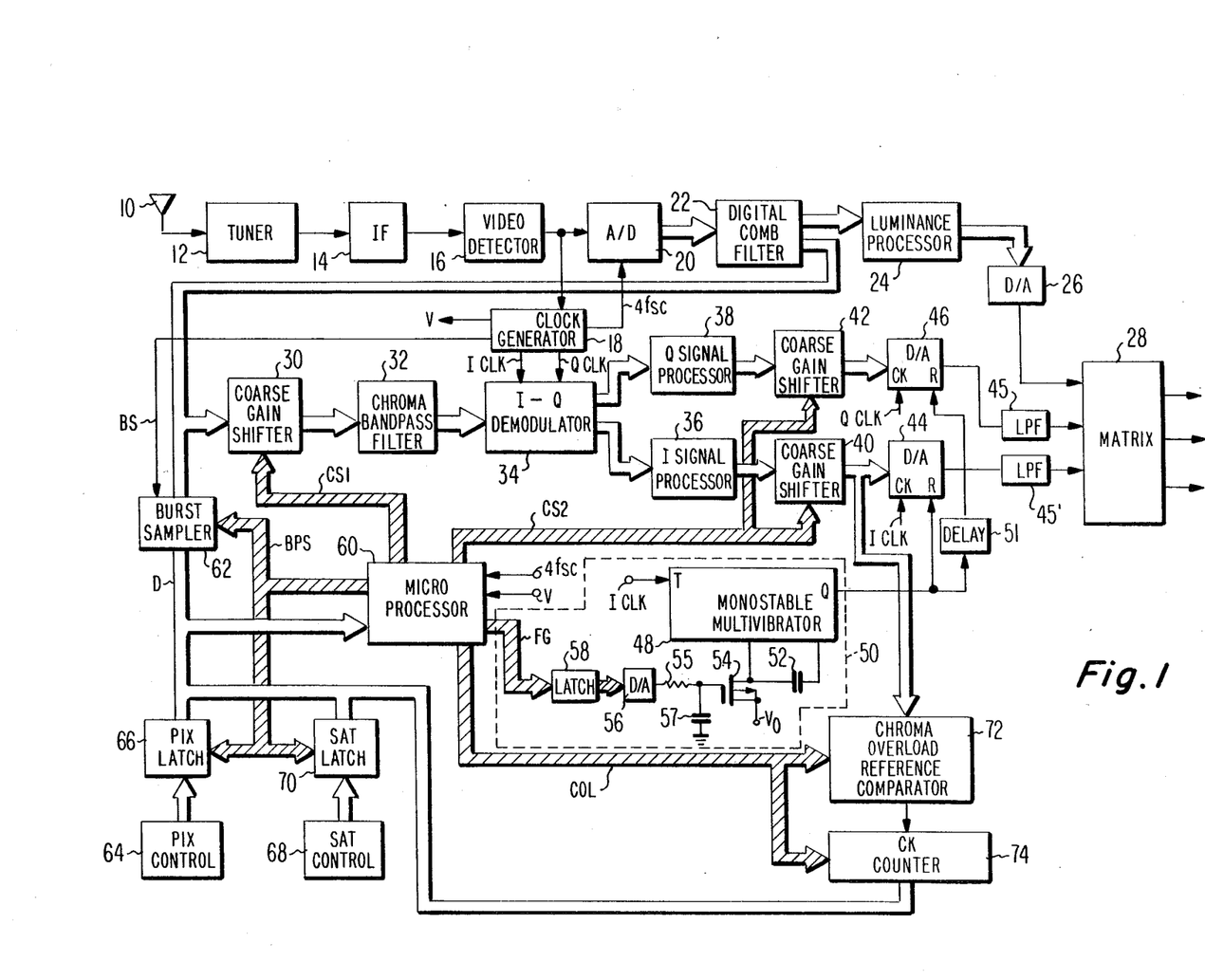
FIG. 1 illustrates a color television receiver, partially by schematic and partially by block diagram, incorporating a fine gain control apparatus according to the present invention.

In the television receiver of FIG. 1, television signals are received at tuner 12 from antenna 10, converted to an intermediate frequency and amplified by IF amplifier 14. Video detector 16 extracts baseband composite video signals from the signals appearing at the output terminal of IF amplifier 14. These composite video signals are applied to clock generator 18 and to analog to digital converter 20.

Clock generator 18 may include horizontal and vertical sync separators as well as a chrominance subcarrier reference signal generator, phase locked to the burst component of the composite video signal. Five signals are provided at the output of generator 18: a system clock signal ($4f_{sc}$) having a frequency equal to four times the color subcarrier frequency; an I clock signal (I CLK) and a Q clock signal (Q CLK), each at two times the color subcarrier frequency but having different phases; a burst gate signal (BS) which is logically high for a short period of time during the burst interval of the composite video signal; and a vertical sync signal (V) which is a pulse having a duration of one system clock period and occurring during the vertical synchronization interval of the composite video signal.

Analog to digital converter 20 is coupled to video detector 16 and to clock generator 18 to receive composite video signals and system clock signals respectively. The output of converter 20 is a digital signal consisting of sequences of eight bit samples representing composite video. These samples are supplied to digital comb filter 22 which provides two digital signals at its output, one representing a separated luminance signal and the other, a separated chrominance signal.

The luminance signal from filter 22 is applied to luminance processor 24 where it may be filtered for noise reduction and peaked. The output signal from processor 24 is applied to D/A converter 26 which produces an analog signal used as an input to RGB matrix 28.

The chrominance signal from comb filter 22 consists of alternate I and Q color difference signal samples. This signal is applied to an input port of coarse gain shifter 30 and to the burst sampler 62. Shifter 30, under control of microprocessor 60, selectively shifts the digital codewords applied to its input port to the left by 0, 1 or 2 bit positions increasing the amplitude of the digital chrominance signal respectively by increments of 0 dB, 6 dB or 12 dB. The value of the two-bit control signal CS1 developed by microprocessor 60 determines the number of bit positions by which the codewords are shifted.

Shifter 30 and all coarse gain shifters used in the present embodiment may be implemented with programmable bit shift circuits as described in U.S. Pat. No. 4,383,304 or by position scalers as described in U.S. Pat. No. 4,411,009.

Coarse gain shifted chrominance samples from shifter 30 are applied to chroma bandpass filter 32 which has a frequency response characteristic that includes the frequencies of the color subcarrier and its sidebands. Filtered digital chrominance samples from filter 32 are demodulated into I and Q color difference signals by demodulator 34 responsive to the I CLK and Q CLK signals from clock generator 18.

The I and Q color difference signals from demodulator 34 are provided to I signal processor 36 and Q signal processor 38 respectively. Processors 36 and 38 may process the color difference signals supplied to their input terminals for noise reduction and autoflesh correction. Digital I color difference signals from processor 36 are applied to the input terminal of coarse gain shifter 40 and digital Q color difference signals from processor 38 are applied to coarse gain shifter 42. Coarse gain shifters 40 and 42 each selectively shifts the digital codewords applied to their input ports to the right by 4, 3, 2, 1 or 0 bit positions or to the left by 1 or 2 bit positions providing gain increments of −24 dB, −18 dB, −12 dB, −6 dB, 0 dB, +6 dB or +12 dB respectively. The value of the 3 bit shifter control signal, CS2, from microprocessor 60 determines the number of bit positions by which the codewords are shifted. Digital output signals from the coarse gain shifters 40 and 42 are then applied to D/A converters 44 and 46 respectively for conversion to analog signals and for fine gain adjustment. D/A converters 44 and 46 synchronously develop analog output signals from the digital I and Q color difference samples applied to their respective data input terminals and the I CLK and Q CLK signals from clock generator 18, applied to their respective clock inputs. Fine gain control is provided by selectively energizing the respective reset input terminals of these two D/A converters as explained below.

The two analog color difference signals from D/A converters 44 and 46 and the analog luminance signal from converter 26 are the three input signals to matrix 28 which generates R, G and B primary color signals. These may be used to drive a display device (not shown) to produce an image.

Figure 2:
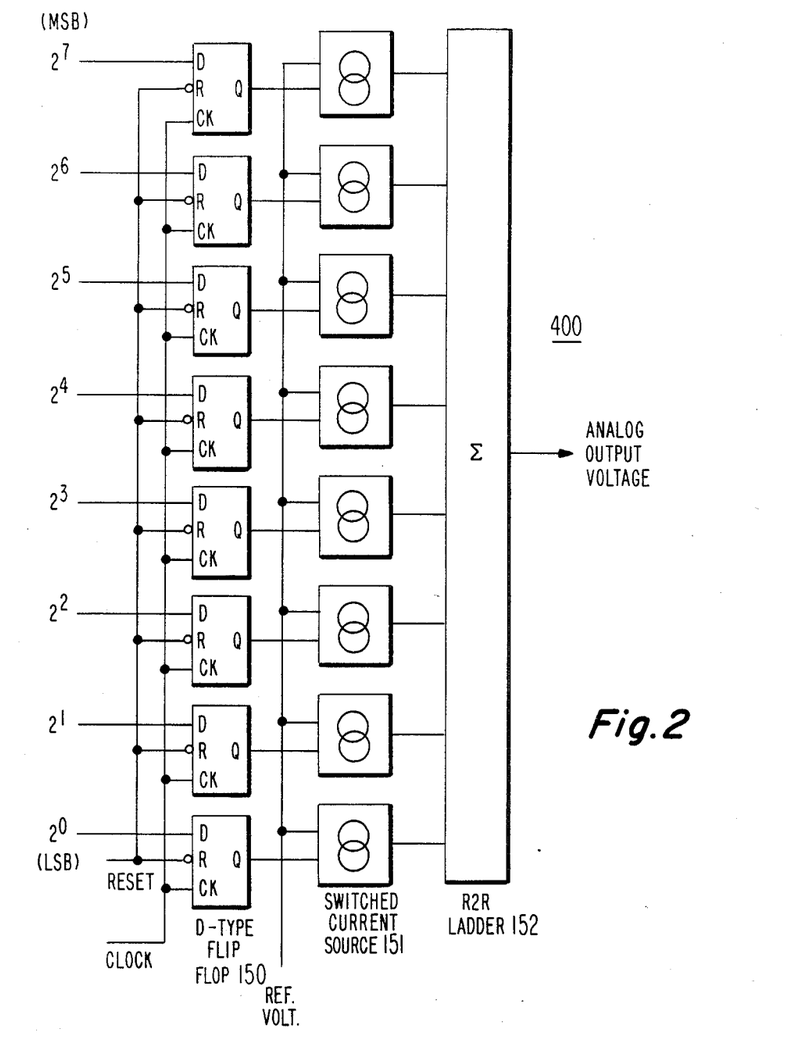
FIG. 2 is a block diagram of a digital to analog converter suitable for use in the fine gain control apparatus of FIG. 1.

To better understand how D/A converters 44 and 46 are used for fine gain adjustment, it is helpful to understand their structure. FIG. 2 shows an eight bit resettable D/A converter suitable for use in the present embodiment. This D/A converter is similar to the one described in U.S. Pat. No. 4,506,291 entitled "TELEVISION RECEIVER WITH DIGITAL SIGNAL PROCESSING HAVING A DIGITAL-TO-ANALOG CONVERTER CONTROL CAPABILITY" (Lewis, Jr.).

To keep the signal to noise ratio high, D/A converter 400 is run in the zero order hold mode using eight data type (D) flip-flops 150. Each of the input bits $2^0$-$2^7$ of a digital sample is applied to a respective D input terminal of a respective one of flip-flops 150. The eight bits of data are strobed into the D flip-flops upon receipt of a clock pulse at the clock input of the D/A converter. Each of the Q output terminals of the flip-flops 150 is coupled to a respectively different one of the eight switched current sources 151. The outputs of the current sources 151 are coupled to a summing network 152, such as a conventional R2R ladder, to produce an analog output potential, the value of which is a function of the digitized signal level represented by the eight bits $2^0$-$2^7$.

When the signal applied at the reset input of the D/A converter goes to a low logic state, all of the flip-flops 150 are reset. The logic low signal at each of the Q output terminals of flip-flops 150 produces a substantially zero analog potential at the output of the D/A converter. When a high logic signal is applied to the reset input of the D/A converter, however, the output of the D/A converter is unaffected.

In this embodiment of the present invention, the average amplitude of the analog color difference signals at the output terminals of the D/A converters 44 and 46 are reduced by applying a pulsed signal to their reset input terminals. The analog signals at the output terminals of the D/A converters 44 and 46 then become amplitude modulated pulses having the same pulse rate and the same pulse width as the signal applied to the reset input. These pulsed analog output signals are applied to low pass filters 45 and 45' respectively to remove the high frequency components attendant the pulses, and to average the signal amplitude over the sample period. The resultant signals are gain reduced versions of the signals applied to the D/A converters. The factor by which the gain is reduced is proportional to the duty cycle of the reset signals applied to the D/A converter. For the gain reduction to be easily controllable, it is desirable that the pulse rates of the clock and reset signals be the same and that the leading edges of the reset pulses coincide with or precede the leading edges of the clock pulses. In the fine gain control used in the present embodiment, the largest attenuation that is desirable is 6 dB, so the minimum duty cycle of the signal applied to the reset input of the D/A converter is 50%.

Figure 3:
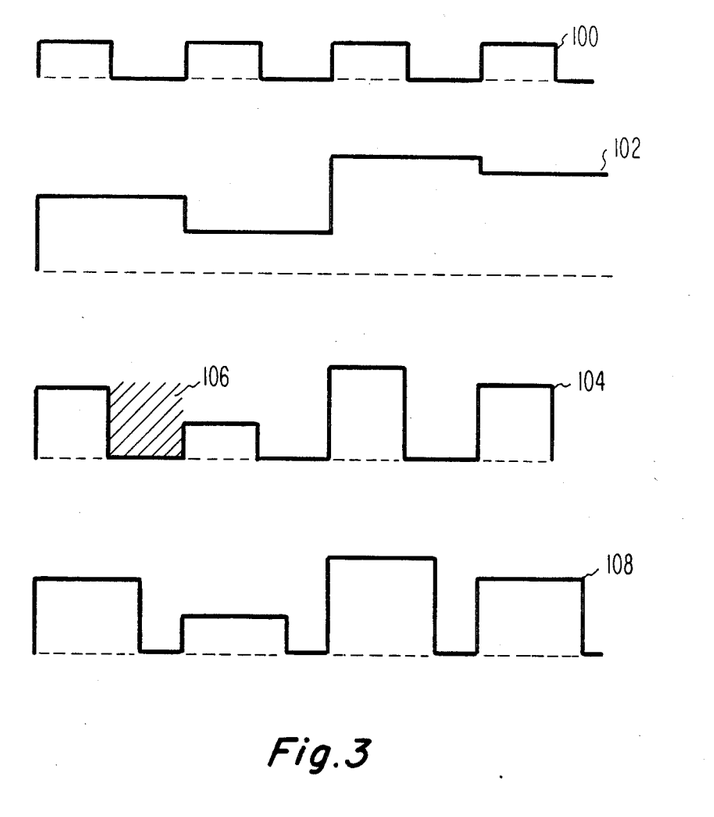
FIG. 3 illustrates the operation of the fine gain control apparatus of FIGS. 1 and 2.

FIG. 3 further illustrates the operation of the D/A converter as a part of the fine gain control. Signal 100 is the clock signal applied to the D/A converter. This may be, for example, the I clock signal I CLK from clock generator 18. Signal 102 is an output signal from a D/A converter which has its reset input held continuously at a high logic value (i.e. the zero order hold output signal). Signal 104 is the output of a D/A converter in response to the same input that produced the signal 102 but with the reset input terminal being pulsed by a signal at the same frequency as the clock signal and having a 50% duty cycle. The average amplitude of signal 104 is, thus, one-half of the average amplitude of signal 102; in other words, if both signals 102 and 104 were low pass filtered to remove sampling artifacts, the filtered version of signal 104 would be analgous to the filtered version of signal 102 reduced by 6 dB. The shaded area 106 represents the amount by which the pulse width of the output signal of the D/A converter may be varied for gain control from a duty cycle of 50%, a −6 dB average amplitude gain increment, to a duty cycle of 100%, a 0 dB average amplitude gain increment. As an example of an intermediate value, the average amplitude of signal 108 represents a 3 dB reduction of the average amplitude of signal 102.

To produce continuous gain control between 0 dB and −6 dB, therefore, the pulse generation apparatus that feeds the reset input of the D/A converter provides pulses at the same frequency as the I or Q clock signal and having a pulse width that is continuously variable between one-half period and one period of the chosen clock signal.

The pulse generation apparatus 50 for the present invention is shown in FIG. 1. Signal I CLK from clock generator 18 supplies the trigger input terminal (T) of monostable multivibrator 48. A monostable multivibrator produces pulses at its output in response to pulses applied to its trigger input. The output pulses change from a low logic state at a high logic state at substantially the same time as the input pulses, but the time interval over which the output pulses remain in a high logic state, i.e. their pulse width, is determined by the timing network of the monostable multivibrator. So, the pulse width of the output pulses can be greater than the pulse width of the input pulses.

When I CLK goes to a high logic state, multivibrator 48 is triggered and its Q output signal goes high. The signal at the output of the multivibrator supplies the reset input (R) of D/A converter 44 which is clocked by the I CLK signal. Delay element 51 also receives the multivibrator output signal at its input and delays the signal by one system clock period. The output signal of delay element 51 provides the reset signal to D/A converter 46 which is clocked by the Q CLK signal. When multivibrator 48 times out, its Q output goes to a low logic state. As this output is coupled to the reset inputs of D/A converters 44 and 46, this signal change causes the output signals of both converters to drop to zero potential. The drop at the output of D/A converter 46 is delayed by one system clock period from the drop at the output of converter 46 due to the delay through delay element 51.

As stated above, the chrominance samples supplied by the comb filter 22 consist of alternate I and Q color difference samples. When these interleaved samples are demodulated by I-Q demodulator 34, therefore, the separated I and Q color difference signals each have sample rates equal to one-half of the sample rate of the chrominance signal. The phases of the two signals differ, however, by 90° (the sample time of one sample of the chrominance signal). This same phase relationship exists between the I CLK and Q CLK signals. As a result, the pulse signal provided by monostable multivibrator 48 is applied without substantial delay to D/A converter 44 for gain control in the I color difference signal channel and applied with a delay of substantially one chrominance signal sample time to D/A converter 46 for gain control in the Q color difference signal channel.

The duration of the pulse from monostable multivibrator 48, its time period, determines the duty cycle of the reset signal applied to the D/A converters and thus the amount of attenuation imposed upon the I and Q color difference signals. This time period is determined by the charging of capacitor 52 in the timing network of the multivibrator 48. Capacitor 52 is normally charged and discharged through the multivibrator connections. The charging rate, and thus the duration of pulses produced by the multivibrator can be modified by shunting a portion of the capacitor charging current. In FIG. 1 the transistor 54 is connected to the capacitor 52 connection to shunt a portion of the charging current responsive to digital fine gain control signal FG developed by microprocessor 60. A fine gain value from microprocessor 60 is placed in latch 58 via bus FG. This value is then converted to an analog potential by D/A converter 56 which may be a simple R2R ladder. This potential is coupled to the gate electrode of transistor 54 by a low pass filter including resistor 55 and capacitor 57. This filter acts to smooth the transitions of the fine gain potential, thus avoiding rapid changes in fine gain applied to the I and Q color difference signals. The source electrode of MOSFET 54 is coupled to a source of operating potential (e.g. VO) and its drain electrode is coupled to capacitor 52 and to one of the timing network electrodes of monostable multivibrator 48. The other end of capacitor 52 is coupled to the other multivibrator timing electrode.

The potential at the gate of MOSFET 54 controls the amount of current that can flow from the drain to the source of MOSFET 54. By controlling this current, the gate potential also controls the charge/discharge time of capacitor 52 and thereby the width of the pulses produced by monostable multivibrator 48.

As stated above, it is desirable that the leading edges of the signals applied to the reset inputs of the D/A converters 44 and 46 precede or coincide with the the leading edges of the signals applied to their clock inputs. In view of this, and in view of the delays inherent in the color difference signal processors 36 and 38 and the coarse gain shifters 40 and 42 it may be desirable to delay the I CLK and Q CLK signals applied to the clock inputs of D/A converters 44 and 46 respectively. The amount of delay required for these signals and for other situations where it is desirable that separately processed signals cooperate via fixed temporal relationships can be readily determined by one skilled in the art.

Microprocessor 60 controls the gain applied within the ACC loop by monitoring various signals to determine how much gain is to be applied and then apportioning the gain among the coarse gain shifters and the fine gain control. The signals monitored by the microprocessor are the burst amplitude from burst sampler 62, the setting of the PIX control 64 and the SAT control 68 via the PIX latch 66 and the SAT latch 70 respectively, and the number of detected chroma overload events via chroma overload detector 72 and counter 74. Burst sampler 62, PIX latch 66, SAT latch 70 and counter 74 are all coupled to provide data to microprocessor 60 via data bus D. Each of these devices has a three state buffer at its output port to allow the microprocessor to selectively interrrogate the device and read its data. The control signals that govern selection of data from burst sampler 62, PIX Latch 66 and SAT latch 70 are sent to the various devices by control bus BPS. Similarly, the chroma overload detector (COD) 72 and counter 74 are controlled by the microprocessor via control bus COL. The various control and data bus functions are set forth in Table II below.

TABLE II

| Unit | μP Mode | Control Bus | Data Bus |
|---|---|---|---|
| Burst Sampler 62 | Send | Transmit Enable | — |
|  | Receive | — | Latched Burst Value |
| PIX Latch 66 | Send | Transmit Enable | — |
|  | Receive | — | Latched PIX Value |
| SAT Latch 70 | Send | Transmit Enable | — |
|  | Receive | — | Latched SAT Value |
| Counter 74 | Send | Transmit Enable | — |
|  | Receive | — | Latched COD Value |
| COD 72 | Send | Receive Enable and COD Reference Value | — |
|  | Receive | — | — |
| Counter 74 | Send | Transmit Enable | — |
|  | Receive | — | COD Value |

Burst sampler 62, in response to the burst sample signal BS developed by clock generator 18 stores the amplitude values of chrominance samples occurring at predetermined times during the color reference burst interval. Preferably, burst sampler 62 samples a plurality of burst samples in each field and develops an average thereof for transmission to the microprocessor. Burst sampler 62 may include an accumulator to sum the samples from each field. If the number of samples is an integral power of two (e.g. 128) the division step required to average the samples can be implemented by gating only the higher order bits onto data bus D (e.g. all but the six least significant bits).

Viewer preferred settings of PIX and SAT levels are applied to PIX latch 66 and SAT latch 70 from viewer input PIX control 64 and SAT control 68 respectively. Latches 66 and 70 latch the preferred value in response to control signals from microprocessor 60 via control bus BPS and transmit these values to the microprocessor via data bus D.

COD 72 receives a COD reference value from microprocessor 60 via control bus COL. Processed digital samples of the I color difference signal from the output of coarse gain shifter 40 are compared against the COD reference value by detector 72. The number of occurrences in which the former exceeds the latter is accumulated by counter 74 and transmitted to microprocessor 60 via data bus D. The control signal to read the value of the counter also zeros the counter.

Figure 4:
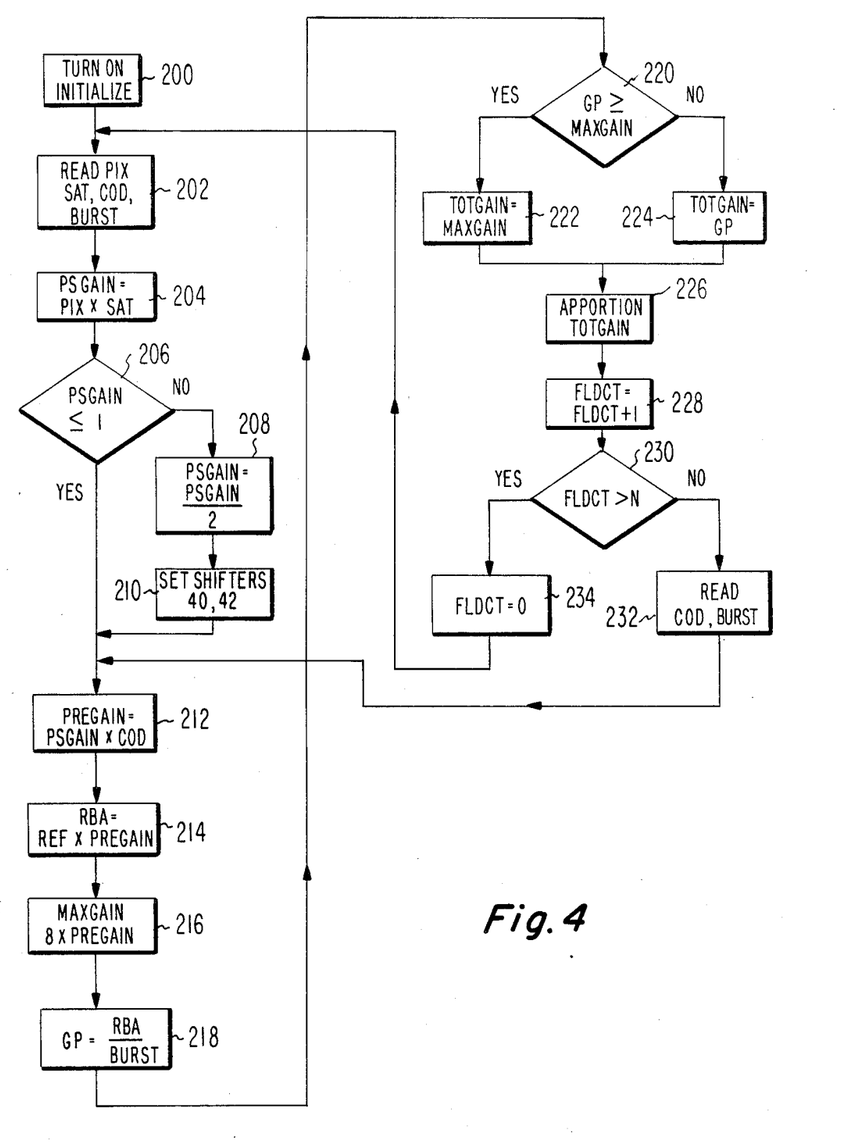
FIG. 4 is a flow chart useful in explaining the operation of the automatic chrominance control apparatus shown in FIG. 1.

Microprocessor 60 computes the total gain required in the chrominance signal path and apportions that gain among shifters 30, 40 and 42 and the fine gain control apparatus. The control sequence of the microprocessor 60 is shown via the flow chart in FIG. 4. In the following description, the reference numerals of the boxes in FIG. 4 representing operations are used immediately following the word describing that operation.

Upon turning the receiver on, all values are initialized 200 to values producing an overall chrominance signal path gain TOTGAIN of unity which corresponds to a nominal operating condition. Then, the viewer-controlled preference levels of SAT and PIX are read from latches 66 and 70 respectively, the operating value of the burst amplitude is read from burst sampler 62 and the number of chrominance overload events, which is zero at this point, is read from counter 74. Next, the partial gain product PSGAIN is calculated 204 from the values of PIX and SAT and is compared 206 to a threshold level. If the value of PSGAIN is greater than one, then the value of PSGAIN is divided 208 by two and the parallel shifters 40 and 42 are set 210 to provide +6 dB gain.

The gain of the parallel I and Q color difference signal shifters is increased by a factor of two at this point to apportion any amplification resulting from the viewer preference controls to the gain control elements following the I and Q signal processing circuits 36 and 38. If the composite viewer preference control value, PSGAIN, indicates a gain larger than unity, the gain applied by the coarse gain shifters is increased by a factor of two, the difference between the actual value requested and the gain of two being a factor used to determine the attenuation to be applied by the fine gain control circuitry. The shifters after the I and Q signal processing circuitry are chosen to add the coarse gain to avoid increasing the noise component of the signals applied to the I and Q signal processing circuitry.

Thereafter, or if the original value of PSGAIN was less than or equal to one, a preliminary gain product PREGAIN is calculated 212 as the product of PSGAIN and COD. A required chrominance subcarrier reference burst value RBA is calculated 214 as the product of the nominal burst amplitude REF (e.g. 40 IRE units) and the PREGAIN value. In addition, a maximum allowable gain value MAXGAIN is calculated 216 to be eight times the PREGAIN value. The MAXGAIN value acts as a limit on the total gain to be applied by the ACC. This limiting value ensures that no more than a 24 dB gain increment is applied to standardize the chrominance signal amplitude. The gain product GP required to achieve a standardized chrominance signal (including viewer preference control values) is calculated 218 by dividing the required burst amplitude value, RBA, by the measured value BURST.

A comparison 220 determines whether the gain product GP exceeds or equals the maximum standardizing gain value MAXGAIN and, if so, sets 222 the overall chrominance signal path gain TOTGAIN to MAXGAIN. If not, TOTGAIN is set 224 to the preferred value GP. Then TOTGAIN is apportioned 226 among the fine gain control apparatus, shifter 30 and the I and Q shifters 40 and 42, according to TABLES III and IV.

TABLE III

| | Gain Apportionment, PSGAIN $\leq$ 1 | | |
|---|---|---|---|
| GP Range | Shifter 30 | Shifters 40 & 42 | Total (Coarse) |
| 8 to 16* | +12 dB | +12 dB | +24 dB |
| 4 to 8 | +12 dB | +6 dB | +18 dB |
| 2 to 4 | +12 dB | 0 dB | +12 dB |
| 1 to 2 | +6 dB | 0 dB | +6 dB |
| .5 to 1 | 0 dB | 0 dB | 0 dB |
| .25 to .5 | 0 dB | −6 dB | −6 dB |
| .125 to .25 | 0 dB | −12 dB | −12 dB |
| .062 to .125 | 0 dB | −18 dB | −18 dB |
| <.062 | 0 dB | −24 dB | −24 dB |

Table entries marked with an asterisk (*) are those levels of GP for which the result of comparison operation 220 could be either YES or NO, however, a result of NO is assumed in the tables. It is noted that total gain values between those listed in the right-hand column are to be provided through the controlled attenuation of the fine gain control circuitry.

TABLE IV

| | Gain Apportionment, PSGAIN > 1 | | |
|---|---|---|---|
| GP Range | Shifter 30 | Shifters 40 & 42 | Total (Coarse) |
| 1 to 2 | 0 dB | +6 dB | +6 dB |
| 2 to 4 | +6 dB | +6 dB | +12 dB |
| 4 to 8 | +12 dB | +6 dB | +18 dB |
| 8 to 16 | +12 dB | +12 dB | +24 dB |

Operations 228 through 234 reduce calculation time by performing a calculation of PSGAIN less frequently than for every field. The field count FLDCT is incremented 228 by one each field time and is compared 230 to a number N representing the number of fields for which a PSGAIN calculation is not performed. N=4 is a satisfactory number. If the comparison 230 result is YES, then FLDCT is reset 234 to zero and the calculation cycle loops back to begin anew at read operation 202, thereby to recalculate a new value of PSGAIN. If the comparison 230 result is NO, the values COD and BURST are read 232 and the calculation cycle loops back to calculation operation 212. It is preferred that the calculation loop complete a gain calculation and apportionment cycle within the time corresponding to one field, and that the read operations 202 and 232, the setting operation 210 and the gain apportionment operation 226 be performed during the vertical blanking interval.

In the described embodiment, the system clock rate is four times the color subcarrier frequency and the signals I CLK and Q CLK that govern the operational rate of the fine gain control apparatus are each at twice the color subcarrier frequency. The invention can be realized, however, in any digital television signal processing apparatus including a D/A converter for processing video signals that could benefit from fine gain control of those video signals regardless of the clock signal frequency.

What is claimed is:

1. A video signal processing apparatus for varying the magnitude of video signals comprising:
   a source of digitized video signals;
   a source of gain control signals;
   a digital to analog converter coupled to said source of digitized video signals for providing pulse amplitude modulated output signal representing the digitized video signals from said source; and
   means responsive to said gain control signals and coupled to said digital to analog converter for varying the duration of the pulses constituting said pulse amplitude modulated signal to thereby vary the time averaged amplitude of said pulse amplitude modulated signals.

2. In a video signal processing apparatus including a source of digitized video signal, said video signal having a reference signal component, a video signal gain control apparatus comprising:
   calculating means responsive to said reference signal component for generating first and second gain control signals;
   coarse gain control means coupled to said source for controllably modifying the magnitude of said digitized video signal by predetermined factors in response to said first gain control signal;
   digital to analog conversion means coupled to said coarse gain control means for developing pulse amplitude modulated analog signals representing the digitized signals from said coarse gain control means; and
   fine gain control means coupled to said digital to analog conversion means for controllably modifying the pulse width of said pulse amplitude modulated signal in response to said second gain control signal.

3. The apparatus of claim 2 wherein said coarse gain control means includes a first controlled digital shift register responsive to said first gain control signal for varying the magnitude of said digitized video signal by a plurality of factors that include positive and negative integral powers of two.

4. The apparatus of claim 3, wherein said fine gain control means includes:
   means for generating a clock signal, synchronized to said source of digitized video signal;
   pulse generating means responsive to said clock signal for generating a pulsed control signal synchronized to said clock signal and responsive to said second control signal for varying the duration of the pulses that constitute said pulsed control signal; and
   wherein said digital to analog converter includes control means responsive to said pulsed control signal for selectively forcing the output signal of said digital to analog converter to a predetermined value.

5. The apparatus of claim 4 wherein said pulse generating means includes a monostable multivibrator having a trigger input coupled to said clock signal and timing inputs coupled to said second control signal.

6. The apparatus of claim 5 wherein said pulse generating means further includes:
a further digital to analog converter responsive to said second control signal for generating a control potential representative thereof;
a capacitor coupled as a timing element for said multivibrator; and
a voltage variable current supplying element responsive to said control potential and coupled to said capacitor for determining the width of pulses generated by said multivibrator.

7. The apparatus of claim 6 further including a user operated control for adjusting the level of gain to be applied to said digitized video signals; and wherein said calculating means is further coupled to said user operated control for calculating a total gain factor by which said digitized video signal is to be modified.

8. In a video signal processing apparatus including a source of digitized color information signal having a reference burst signal component, a color information signal gain controlling apparatus comprising:
burst sampling means for supplying a signal representing the amplitude of the reference burst component of said digitized color information signal;
calculating means coupled to said burst sampling means and responsive to the amplitude of said burst component for calculating a gain factor to be applied to said digitized color information signal and for developing first and second gain control signals;
course gain control means coupled to said source, for controllably modifying the magnitude of said digitized color information signal by integral powers of two in response to said first gain control signal;
digital to analog conversion means coupled to said coarse gain control means for developing pulse amplitude modulated analog signals representing the digitized signal from said coarse gain control means; and
fine gain control means coupled to said digital to analog conversion means for controllably modifying the pulse width of said pulse amplitude modulated signal in response to said second gain control signal.

9. The apparatus of claim 8 wherein said fine gain control means includes:
means for generating a clock signal synchronized to said source of digitized color information signals;
pulse generating means responsive to said clock signal for generating a pulsed control signal synchronized to said clock signal; and
timing means responsive to said second control signal for varying the duration of the pulses that constitute said pulsed control signal; and
wherein said digital to analog converter includes control means responsive to said pulsed control signal for forcing the output signal of said digital to analog converter to a predetermined value.

10. The apparatus of claim 9 wherein said pulse generating means includes
a monostable multivibrator having a trigger input coupled to said clock, and timing inputs coupled to said timing means.

11. The apparatus of claim 10 wherein said timing means includes:
a further digital to analog converter responsive to said second control signal for generating a control potential representative thereof;
a capacitor coupled as a timing element for said multivibrator; and
a voltage variable current supplying element responsive to said control potential and coupled to said capacitor for determining the width of pulses generated by said multivibrator.

12. The apparatus of claim 11 further including a user operated control for adjusting the level of amplification or attenuation to be applied to said digitized color information signals;
wherein said calculating means is further coupled to said user operated control for calculating said gain factor.

13. The apparatus of claim 12 further including a chroma overload detector, coupled to said coarse gain control means for detecting digitized color information signal levels in excess of a predetermined threshold,
wherein said calculating means is further coupled to said chroma overload detector for calculating said gain factor.

* * * * *